United States Patent
Fair et al.

(10) Patent No.: US 10,263,720 B2
(45) Date of Patent: *Apr. 16, 2019

(54) MAINTAINING CLOCK SYNCHRONIZATION IN A DIGITAL NETWORK WITHOUT CONTINUOUS TRANSMISSION

(71) Applicant: Audio-Technica U.S., Inc., Stow, OH (US)

(72) Inventors: Brian K. Fair, Boyds, MD (US); Robert T. Green, Streetsboro, OH (US); Jacquelynn A. Green, Streetsboro, OH (US)

(73) Assignee: AUDIO-TECHNICA U.S., INC., Stow, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 14/915,609

(22) PCT Filed: Sep. 11, 2014

(86) PCT No.: PCT/US2014/055200
§ 371 (c)(1),
(2) Date: Feb. 29, 2016

(87) PCT Pub. No.: WO2015/038776
PCT Pub. Date: Mar. 19, 2015

(65) Prior Publication Data
US 2016/0211935 A1    Jul. 21, 2016

Related U.S. Application Data

(60) Provisional application No. 61/876,693, filed on Sep. 11, 2013.

(51) Int. Cl.
*H04J 3/00* (2006.01)
*H04J 3/06* (2006.01)
(Continued)

(52) U.S. Cl.
CPC .............. *H04J 3/0658* (2013.01); *G06F 1/12* (2013.01); *H04B 7/2656* (2013.01);
(Continued)

(58) Field of Classification Search
CPC .................................................... H04J 3/0658
See application file for complete search history.

(56) References Cited

U.S. PATENT DOCUMENTS

| 566,636 | A | * | 8/1896 | Waldron | ................. F16K 35/00 251/94 |
| 5,872,518 | A | * | 2/1999 | Kushita | ................ G08B 3/1066 340/2.1 |

(Continued)

FOREIGN PATENT DOCUMENTS

| EP | 2549807 A1 | 1/2013 |
| JP | H04326826 A | 11/1992 |

(Continued)

OTHER PUBLICATIONS

International Search Report and Written Opinion dated Dec. 4, 2014 for International Application No. PCT/US2014/055200 from International Searching Authority, pp. 1-14, United States.

(Continued)

*Primary Examiner* — Gerald A Smarth
(74) *Attorney, Agent, or Firm* — Sherman IP LLP; Kenneth L. Sherman; Hemavathy Perumal (57) ABSTRACT

Embodiments of the present invention provide a mobile device comprising a slave clock, a receiver unit for receiving one or more frames from a remote device including a master system clock, a transmitter unit for transmitting one or more frames to the remote device, and a clock error correction unit. The clock error correction unit is configured to maintain clock synchronization between the slave clock and the (Continued)

master system clock, and maintain frame alignment for frames transmitted from the transmitter unit.

15 Claims, 10 Drawing Sheets

(51) Int. Cl.
*G06F 1/12* (2006.01)
*H04B 7/26* (2006.01)
*H04L 7/00* (2006.01)
*H04L 7/04* (2006.01)
*H04W 56/00* (2009.01)
*H04R 27/00* (2006.01)

(52) U.S. Cl.
CPC .......... *H04J 3/0682* (2013.01); *H04L 7/0037* (2013.01); *H04L 7/042* (2013.01); *H04W 56/001* (2013.01); *H04R 27/00* (2013.01); *H04R 2227/003* (2013.01); *H04R 2420/07* (2013.01)

(56) References Cited

U.S. PATENT DOCUMENTS

| | | |
|---|---|---|
| 6,456,614 B1 | 9/2002 | Guan et al. |
| 6,577,872 B1 | 6/2003 | Lundh et al. |
| 6,944,188 B2 | 9/2005 | Sinha et al. |
| 7,190,963 B2 | 3/2007 | Wesby et al. |
| 7,535,931 B1 | 5/2009 | Zampetti et al. |
| 8,571,158 B2 | 10/2013 | Chen et al. |
| 2005/0164743 A1 | 7/2005 | Wesby et al. |
| 2009/0054075 A1 | 2/2009 | Boejer et al. |
| 2009/0167653 A1 | 7/2009 | Lin |
| 2009/0245334 A1* | 10/2009 | Chaudhuri ............ H04B 1/406 375/222 |
| 2011/0158364 A1 | 6/2011 | Fullam |
| 2011/0235621 A1* | 9/2011 | Ko ................... H04W 72/1215 370/338 |
| 2014/0016926 A1* | 1/2014 | Soto .................. H04B 10/0775 398/16 |
| 2014/0023048 A1* | 1/2014 | Vu .......................... H04B 7/26 370/336 |
| 2015/0043688 A1 | 2/2015 | Anastasov et al. |
| 2016/0269136 A1 | 9/2016 | Fair et al. |

FOREIGN PATENT DOCUMENTS

| | | |
|---|---|---|
| JP | H11122253 A | 4/1999 |
| JP | 2007235217 A | 9/2007 |
| WO | 0213421 A2 | 2/2002 |

OTHER PUBLICATIONS

International Preliminary Report on Patentability dated Sep. 30, 2015 for International Application No. PCT/US2014/055200 from International Preliminary Examining Authority, pp. 1-23, United States.
U.S. Non-Final Office Action for U.S. Appl. No. 15/162,466 dated Oct. 6, 2017.
Extended European Search Report dated Apr. 7, 2017 for European Application No. 14843705.6 from European Patent Office Action, pp. 1-8, Munich, Germany.
Chinese Office Action dated Apr. 28, 2018 for Chinese Patent Application transNo. 201480050137.6 for Chinese Patent Office, pp. 1-13, Beijing, China (English translation included on pp. 1-8).
European Examination Report dated May 18, 2018 for European Application No. 14843705.6 from European Patent Office, pp. 1-5, Munich, Germany.
U.S. Final Office Action for U.S. Appl. No. 15/162,466 dated May 18, 2018.
European Examination Report dated Dec. 14, 2017 for European Application No. 14843705.6 from European Patent Office, pp. 1-6, Munich, Germany.
U.S. Notice of Allowance for U.S. Appl. No. 15/162,466 dated Sep. 5, 2018.
European Examination Report dated Oct. 26, 2018 for European Application No. 14843705.6 from European Patent Office, pp. 1-4, Munich, Germany.
Japanese Office Action dated Dec. 11, 2018 for Japanese Patent Application No. 2016-542102 for Japanese Patent Office, pp. 1-8, Chiyoda-ku Tokyo, Japan.
Chinese Office Action dated Dec. 6, 2018 for Chinese Patent Application No. 201480050137.6 for Chinese Patent Office, pp. 1-13, Beijing, China.

* cited by examiner

MAINTAINING CLOCK SYNCHRONIZATION IN A DIGITAL NETWORK WITHOUT CONTINUOUS TRANSMISSION

CROSS-REFERENCE TO RELATED APPLICATIONS

This application is the U.S. National Phase Patent Application under 35 U.S.C. § 371 of International Application Number PCT/US2014/055200, filed Sep. 11, 2014, which claims priority to U.S. Provisional Patent Application Ser. No. 61/876,693, filed on Sep. 11, 2013, incorporated herein by reference.

BACKGROUND OF THE INVENTION

Field of the Invention

The present invention relates generally to maintaining clock synchronization in a digital network without continuous transmission of a signal across the network.

Description of Related Art

Electronic devices that are remote from one another in a network must be synchronized so that they may properly function together. For example, electronic audio devices within an audio system (e.g., a public address system including microphones, amplifiers and/or loudspeakers) must be synchronized to properly communicate and function together. A high speed clock signal may be shared between the audio devices to maintain synchronization between the audio devices. In some cases, however, sharing of a high speed clock signal between audio devices is impractical as the audio devices are not within close proximity to each other or because there is not a continuous signal being transmitted between the devices or for many other reasons.

BRIEF SUMMARY OF THE INVENTION

The preferred embodiments of the present invention provide communication networks including a mobile device and a remote device. The mobile device may comprise a slave clock, a receiver unit for receiving one or more frames from the remote device, a transmitter unit for transmitting one or more frames to the remote device and a clock error correction unit. The remote device may include a master system clock. The clock error correction unit is configured to maintain clock synchronization between the slave clock and the master system clock, and maintain frame alignment for frames transmitted from the transmitter unit to the remote device.

These and other features, aspects, and advantages of the present invention will become understood with reference to the following description, appended claims, and accompanying figures.

DETAILED DESCRIPTION OF THE INVENTION

The illustrated preferred embodiments of the present invention provide a communications network including a mobile device and a remote device. The mobile device may comprise a slave clock, a receiver unit for receiving one or more frames from the remote device, a transmitter unit for transmitting one or more frames to the remote device and a clock error correction unit. The remote device may include a master system clock. The clock error correction unit is configured to maintain clock synchronization between the slave clock and the master system clock, and maintain frame alignment for frames transmitted from the transmitter unit to the remote device.

Figure 1:
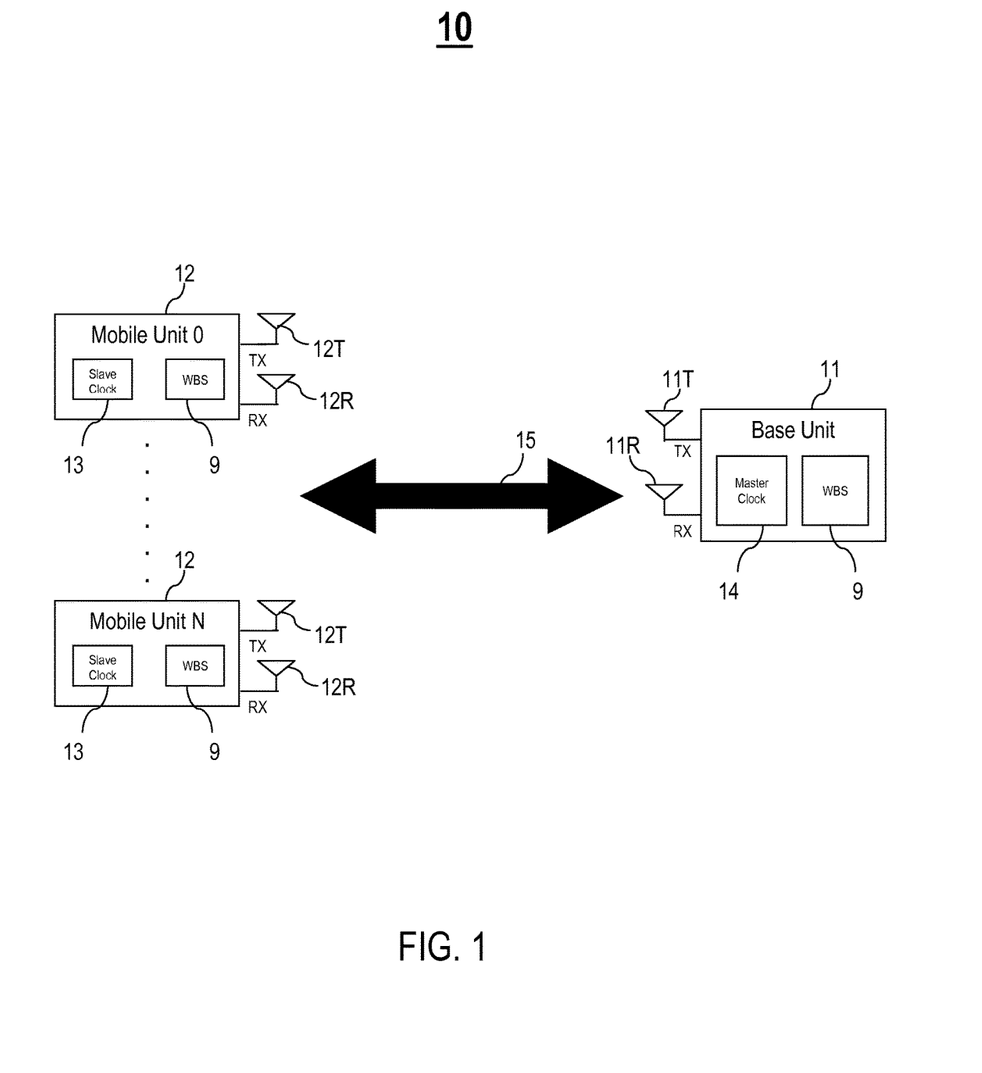
FIG. 1 is a block diagram of a digital wireless system, in accordance with a preferred embodiment of the invention.

FIG. 1 is a block diagram of a digital wireless system 10, in accordance with a preferred embodiment of the invention. The system 10 comprises a base unit 11 and one or more mobile units 12. In one embodiment, the base unit 11 may represent an electronic device for receiving and outputting data (e.g., audio data, video data, etc.). Examples of a base unit 11 include an audio receiver, an amplifier, a loud speaker, etc. Each mobile unit 12 may represent an electronic device for capturing and transmitting data (e.g., captured/recorded audio data, captured/recorded video data). The mobile unit 12 may further include a transducer unit to capture stimulus and reduce the stimulus to an electronically coded signal. Examples of a mobile unit 12 include a microphone, a video camera, etc.

In one preferred embodiment of a network of the invention, each of the base unit 11 and each mobile unit 12 may each include a wireless base station (WBS) 9 configured to wirelessly communicate/exchange information over a wireless communication link 15. For example, the base unit 11 and each mobile unit 12 may operate on one or more radio frequencies. Each mobile unit 12 includes a wireless transceiver 12T and a wireless receiver 12R, and the base unit 11 includes a wireless transceiver 11T and a wireless receiver 11R. Each wireless transceiver 12T of each mobile unit 12 is configured to wirelessly transmit radio frequency (RF) signals to the wireless receiver 11R of the base unit 11. Each wireless transceiver 12T of each mobile unit 12 is configured to wirelessly receive RF signals from the wireless transmitter 11T of the base unit 11.

As another example, the base unit 11 and each mobile unit 12 may wirelessly communicate/exchange information using infrared (I/R) waves or I/R signals.

The base unit 11 includes a system master clock 14. Each mobile unit 12 includes a slave clock 13. As described in detail later herein, each slave clock 13 may be synchronized with the system master clock 14 in the absence of a continuous transmission of a signal between the slave clock 13 and the system master clock 14.

Figure 2:
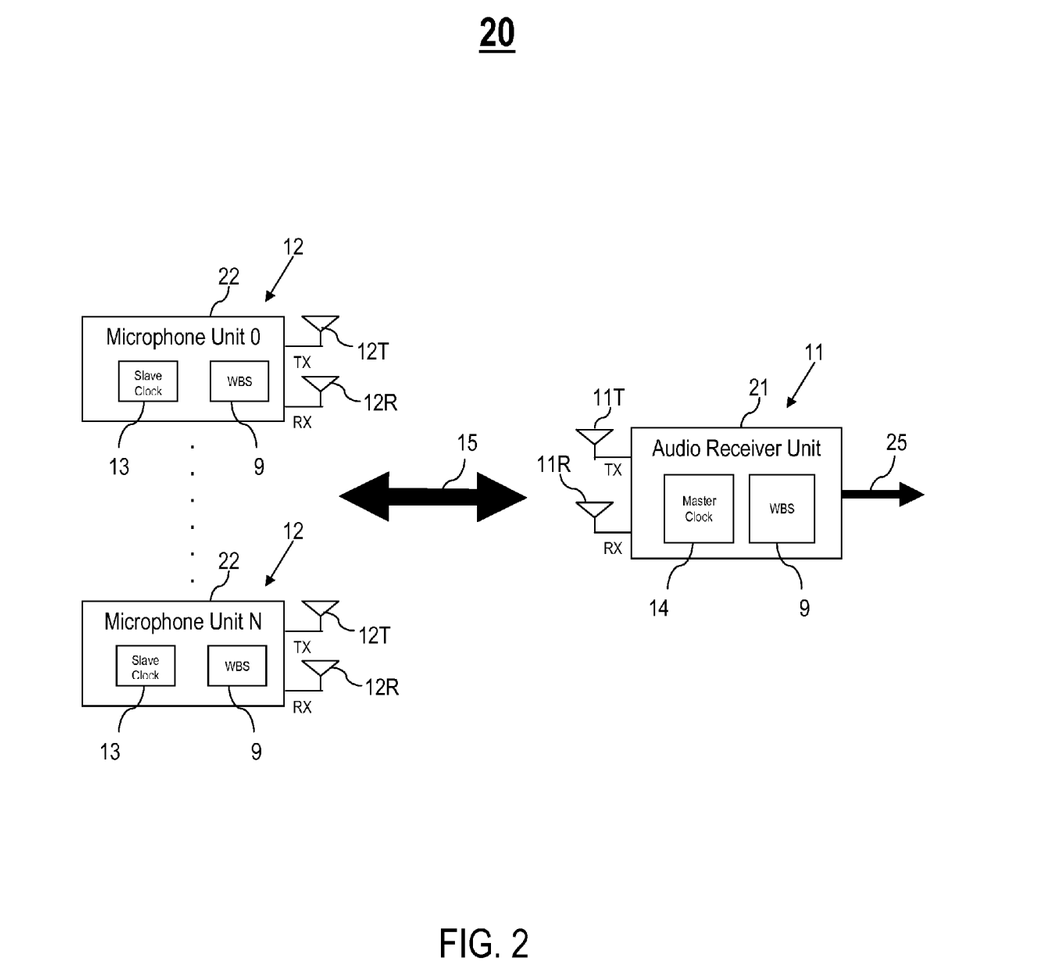
FIG. 2 is a block diagram of a digital wireless microphone system, in accordance with a preferred embodiment of the invention.

FIG. 2 is a block diagram of a digital wireless microphone system 20, in accordance with a preferred embodiment of a network developed in accordance with the invention. The network system 20 is an example digital wireless system 10 comprising an audio receiver unit 21 and one or more microphone units 22. The audio receiver unit 21 is an example of a base unit 11. Each microphone unit 22 is an example of a mobile unit 12. The audio receiver unit 21 and the microphone units 22 wirelessly communicate/exchange information over a wireless communication link 15.

In one preferred embodiment of the invention, the audio receiver unit 21 may transmit audio data received from each microphone unit 22 (e.g., audio data captured/recorded by each microphone unit 22) over a cable connection link 25 to another system/device for processing or output, such as a public address system including amplifiers and/or loud speakers.

Figure 3:
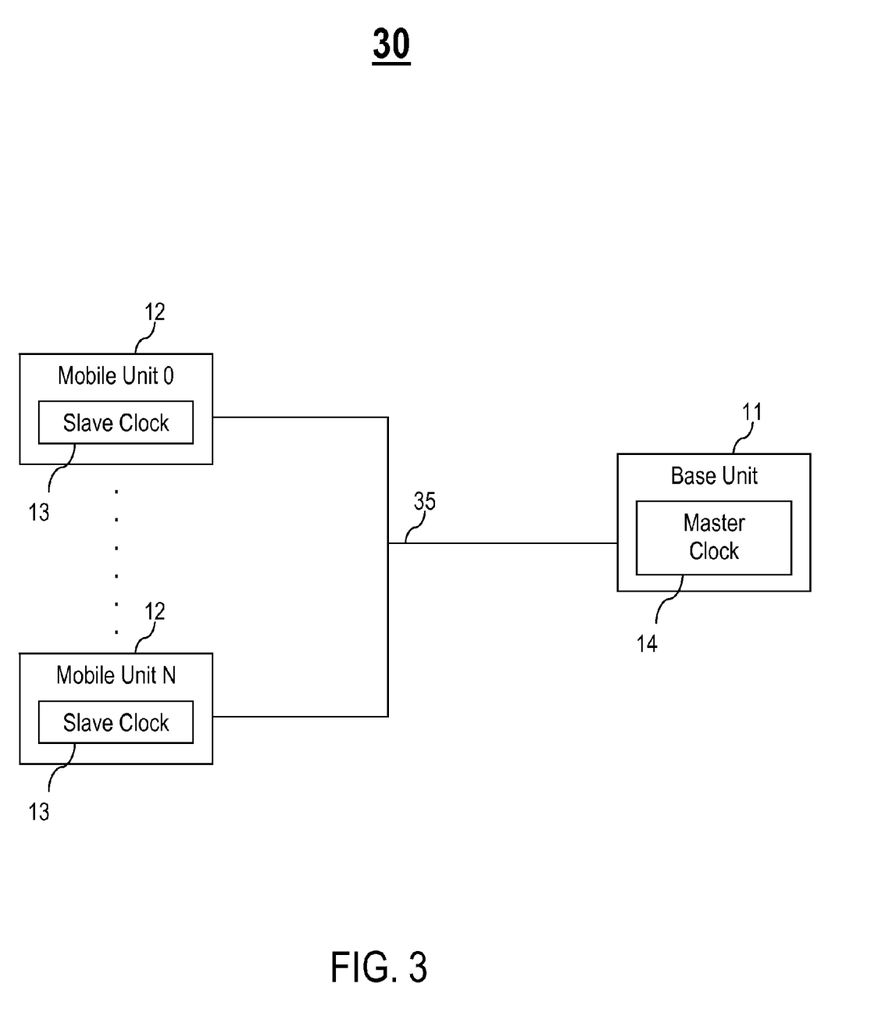
FIG. 3 is a block diagram of a digital wired system, in accordance with a preferred embodiment of the invention.

FIG. 3 is a block diagram of a digital wired system 30, in accordance with a preferred embodiment of the invention. The system 30 comprises a base unit 11 and one or more mobile units 12. In one embodiment, the base unit 11 and each mobile unit 12 communicate/exchange information via a wired communication link 35. As described in detail later herein, each slave clock 13 may be synchronized with the system master clock 14 in the absence of a continuous transmission of a signal between the slave clock 13 and the system master clock 14.

Figure 4:
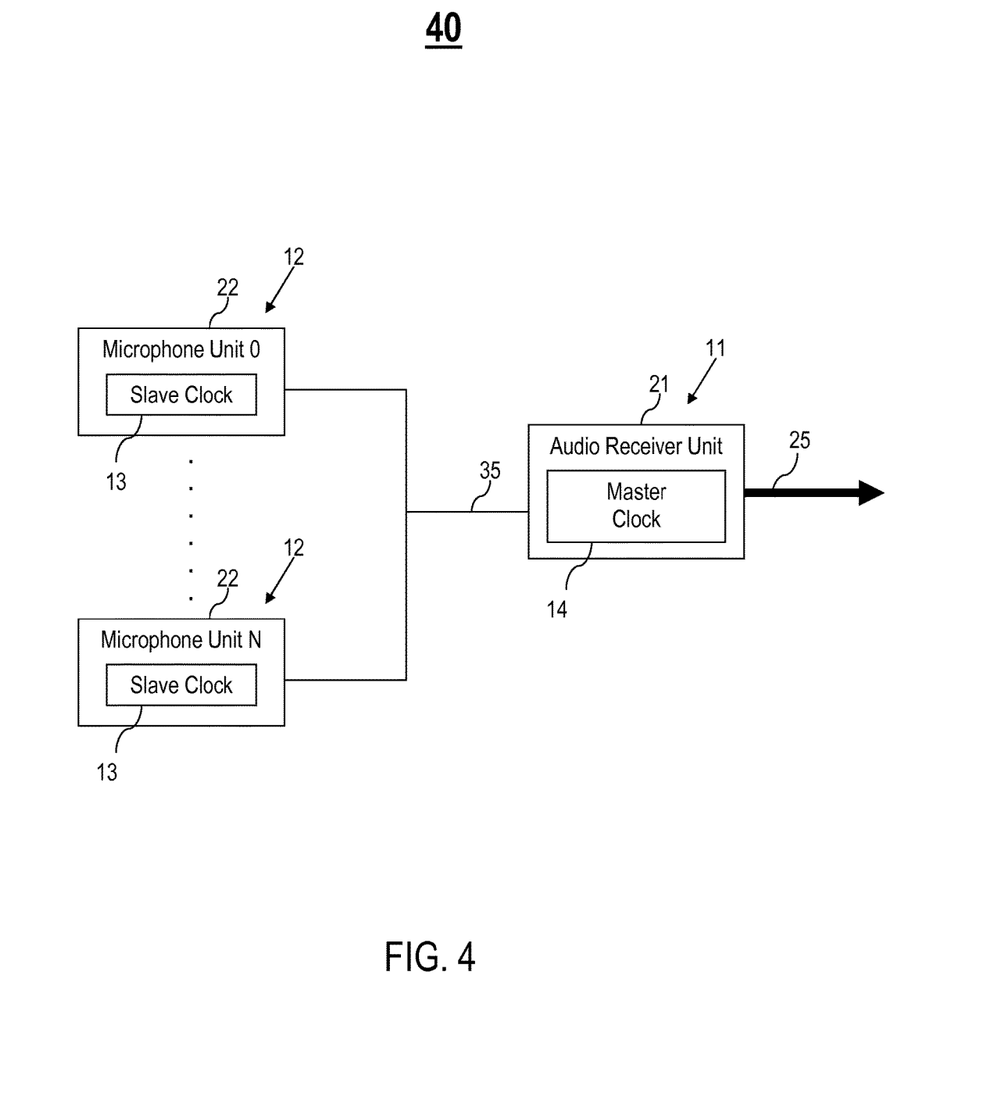
FIG. 4 is a block diagram of a digital wired microphone system, in accordance with a preferred embodiment of the invention.

FIG. 4 is a block diagram of a digital wired microphone system 40, in accordance with a preferred embodiment of the invention. The system 40 is an example digital wired system 10 comprising an audio receiver unit 21 and one or more microphone units 22. The system 40 comprises an audio receiver unit 21 and one or more microphone units 22. The audio receiver unit 21 and the microphone units 22 communicate/exchange information via a wired communication link 35.

Figure 5:
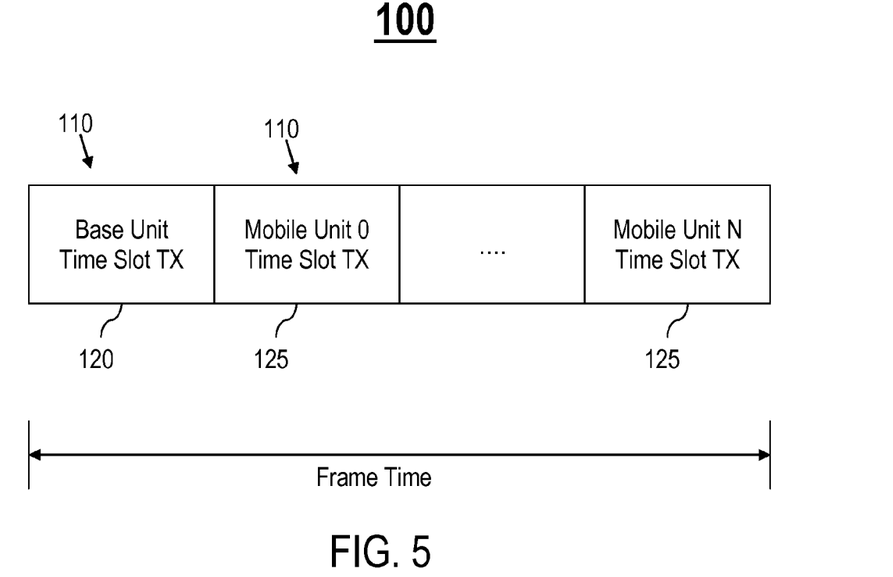
FIG. 5 illustrates an example frame structure, in accordance with a preferred embodiment of the present invention.

FIG. 5 illustrates an example frame structure 100, in accordance with a preferred embodiment of the present invention. As described in detail later herein, to maintain clock synchronization with a system master clock 14 of a base unit 11, a mobile unit 12 computes measurements and adjusts a slave clock 13 of the mobile unit 12 based on the measurements computed. In order for the mobile unit 12 to compute measurements necessary to maintain lock (i.e., maintain clock synchronization with the system master clock 14), a frame structure 100 from the base unit 11 needs to be known ahead of time, and be regular and repeatable. If the base unit 11 sends information in an ad-hoc manner instead (i.e., outside of a frame structure), the mobile unit 12 will not be able to compute the measurements necessary to maintain lock.

In one embodiment, structured, regular, repeatable frame structures 100 are utilized to maintain clock synchronization between a system master clock 14 and each slave clock 13 in a digital network without a continuous signal transmission between the slave clock 13 and the system master clock 14.

Embodiments of the present invention may be applicable to different types of known frame structures. In one preferred embodiment of the invention, the frame structure 100 is a Time Division Multiple Access (TDMA) frame structure which may be divided into multiple time slots 110. The base unit 11 and the mobile units 12 may transmit frames 1 (shown in FIG. 10), over the same channel which may be a radio frequency or via the same cable connection link 35, at different time slots. Each unit 11, 12 has a designated time slot 110.

Specifically, the frame structure 100 includes a base unit time slot 120, wherein the base unit time slot 120 represents a time slot 110 designated for the base unit 11. The frame structure 100 may further include one or more mobile unit time slots 125, wherein each mobile unit time slot 125 represents a time slot 110 designated for a particular mobile unit 12. When the base unit 11 transmits a frame 1 during a base unit time slot 120, the mobile units 12 attempt to receive the transmitted frame 1 during the base unit time slot 120. Similarly, when a mobile unit 12 transmits a frame 1 during a corresponding mobile unit time slot 125, the base unit 11 attempts to receive the transmitted frame 1 during the mobile unit time slot 125.

In one preferred embodiment of the invention, each slave clock 13 of each mobile unit 12 is synchronized upon receiving a frame 1 transmitted by the base unit 11 during a base unit time slot 120. Upon receiving the transmitted frame 1, frames 1 from each mobile unit 12 are aligned in accordance with the frame structure 100.

In another preferred embodiment of the invention, the frame structure 100 is another type of frame structure that is regular and repeatable, such as a code division multiple access (CDMA) burst frame structure.

In one preferred embodiment of the invention, the base unit 11 and the mobile units 12 transmit frames 1 at any one point in time over multiple radio frequencies (e.g., the wireless transceivers 11T, 12T operate on a different radio frequency than the wireless receivers 11R, 12R).

In another preferred embodiment of the invention, different wired topologies may be utilized. For example, for each mobile unit 12, two wired connection links 25 may be used to interconnect the mobile unit 12 to the base unit 11.

Figure 6:
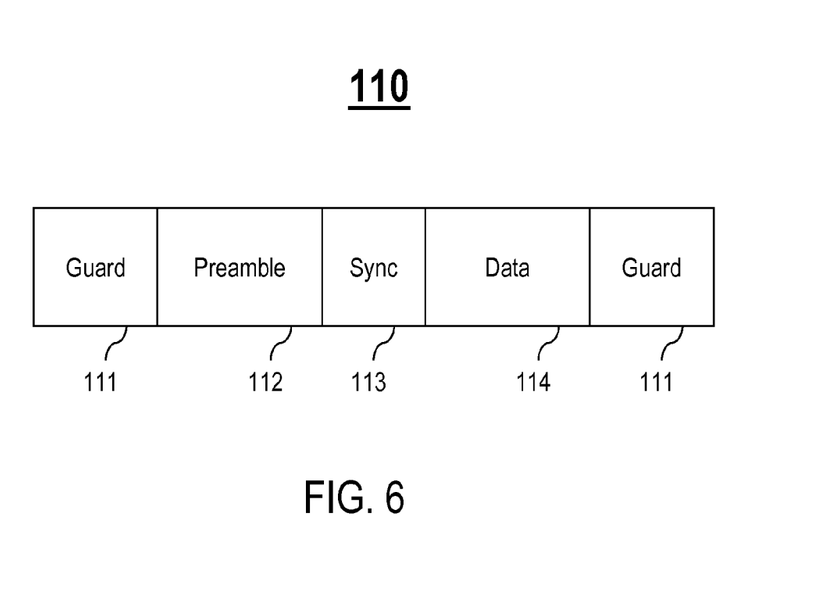
FIG. 6 illustrates an example slot structure for a time slot, in accordance with a preferred embodiment of the invention.

FIG. 6 illustrates an example slot structure for a time slot 110, in accordance with a preferred embodiment of the invention. As stated above, each unit 11, 12 transmits a frame 1 during a designated time slot 110. In one embodiment, a frame 1 transmitted by a unit 11 includes multiple fields representing different types of information, such as a guard band field 111, a preamble field 112, a sync field 113, and a data field 114.

Figure 7:
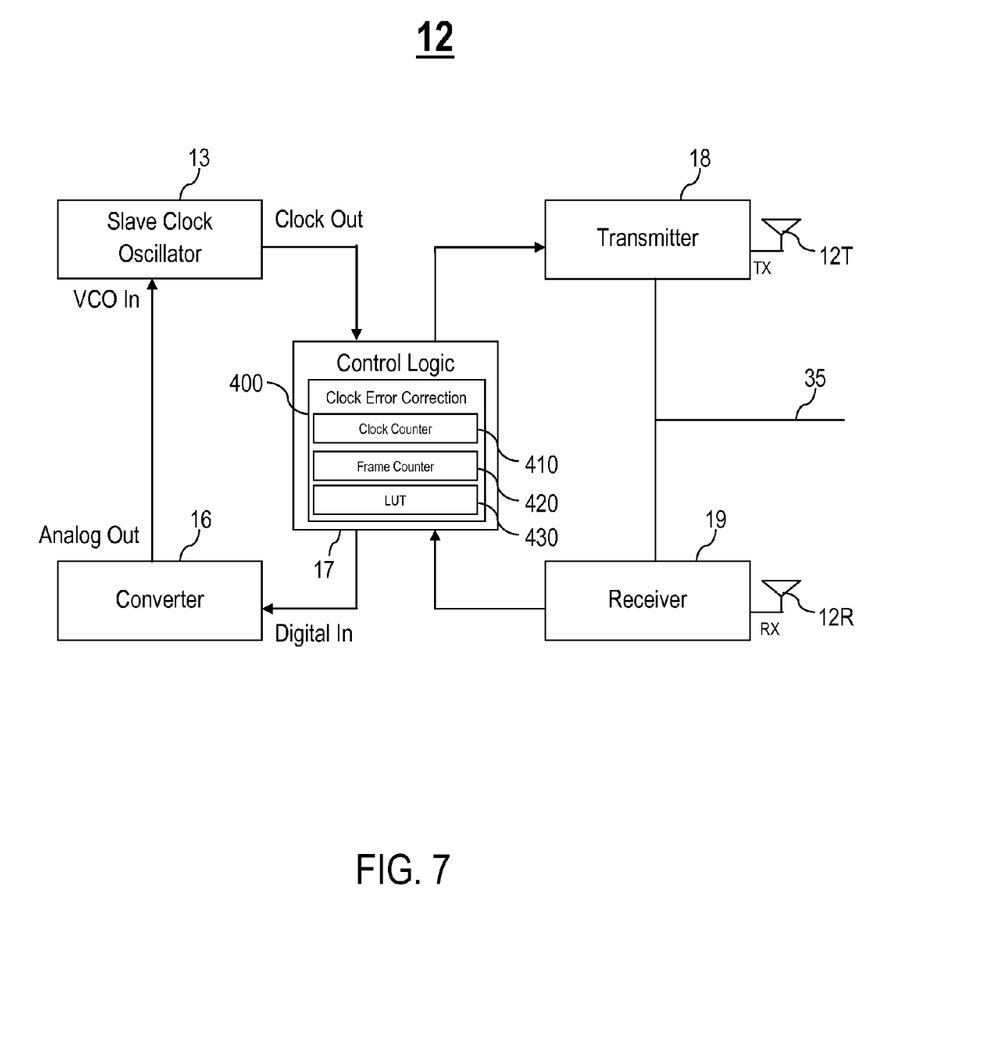
FIG. 7 is a block diagram of an example mobile unit, in accordance with a preferred embodiment of the invention.

FIG. 7 is a block diagram of an example mobile unit 12, in accordance with a preferred embodiment of the invention. In one embodiment, a slave clock 13 of a mobile unit 12 is a slave clock oscillator. The mobile unit 12 further comprises a converter 16 (e.g., a digital-to-analog converter), a control logic module 17, a transmitter 18, and a receiver 19. The transmitter 18 is configured to transmit frames 1 to a base unit 11 (e.g., via a wired connection link 35 or wirelessly via a wireless transceiver 12T over a wireless connection link 15). The receiver 19 is configured to receive frames 1 from a base unit 11 (e.g., via a wired connection link 35 or wirelessly via a wireless receiver 12R over a wireless connection link 15).

To determine frame timing, the mobile unit 12 monitors a frame structure 110 to locate a base unit time slot 120 included in the frame structure 110. The mobile unit 12 will not transmit frames 1 until it locates the base unit time slot 120 and its slave clock 13 is synchronized with the system master clock 14 of the base unit 11.

To maintain clock synchronization between the system master clock 14 and the slave clock 13, the control logic module 17 locally calculates multiple clock error correction parameters, and adjusts the slave clock 13 based on the clock error parameters calculated. The mobile unit 12 does not need to rely on calculations/measurements from remote entities, such as the base unit 11 or another mobile unit 12.

In one preferred embodiment of the invention, the slave clock 13 is adjusted to compensate for differences in frequency and/or phase between the system master clock 14 and the slave clock 13. Adjusting the slave clock 13 to compensate for differences in frequency and/or phase between the system master clock 14 and the slave clock 13 also maintains frame alignment of the frame structure 100. Without phase correction, a slow drift in time will occur and frames 1 from the mobile unit 12 will not be aligned in accordance with the frame structure 100.

In this specification, let CFE denote a clock frequency error between two clock periods in parts per million (PPM) units. In general, a clock frequency error CFE is calculated in accordance with equation (1) as provided below:

$$CFE = ((T_m - T_s)/T_s) * 10^6 \quad (1),$$

wherein $T_m$ represents clock period of the system master clock 14, and wherein $T_s$ represents clock period of the slave clock 13.

In one preferred embodiment of the invention, the control logic module 17 includes a clock error correction unit 400 for calculating the clock error correction parameters used in adjusting the slave clock 13. The clock error correction unit 400 locally maintains a clock counter 410 and a frame counter 420. The clock counter 410 maintains an integer value Clk_Cnt representing the number of clock cycles that has elapsed. The frame counter 420 maintains an integer value Frm_Cnt representing the number of frames that has transpired since a previous measurement computed/performed by the mobile unit 12.

In this specification, let MAX_CLK_CNT denote a threshold integer value representing a maximum number of clock cycles.

When the mobile unit 12 locates a first base unit time slot 120, the clock counter 410 and the frame counter 420 are reset. The clock counter 410 is incremented at every clock cycle. The frame counter 420 is incremented when the clock counter 410 equals MAX_CLK_CNT/2. In one embodiment, the frame counter gets reset after every measurement.

After a minimum number of frames 1 has transpired and a next base unit time slot 120 is located, the clock error correction unit 400 computes a measurement (i.e., performs a measurement pass). Specifically, the clock error correction unit 400 calculates a clock frequency error CFE in accordance with equation (2) as provided below:

$$CFE = (Clk\_Cnt * CONST_{PPM})/Frm\_Cnt \quad (2),$$

wherein $CONST_{PPM} = (Clk\_Prd * 10^6)/Frm\_Prd$, wherein Clk_Prd represents clock period of the slave clock 13, and wherein Frm_Prd represents frame period.

In one preferred embodiment of the invention, the clock frequency error calculated is a two's complement signed number. The sign of the clock frequency error determines whether the slave clock 13 is faster or slower than the system master clock 14. For example, the slave clock 13 is faster than the system master clock 14 if the clock frequency error value is positive. The slave clock 13 is slower than the system master clock 14 if the clock frequency error value is negative.

In one preferred embodiment of the invention, the calculation of clock frequency error comprises two parts. First, differences in frequency and/or phase between the system master clock 14 and the slave clock 13 are measured. Second, the slave clock 13 is adjusted based on the differences measured.

in this specification, let $\Delta_t$ represent a measured time difference between the system master clock 14 and the slave clock 13 after a minimum number of frames 1 has transpired. The time difference $\Delta_t$ is measured in clock cycles. The minimum number of frames 1 is selected to be lone enough for an accurate measurement pass, but short enough such that a time difference $\Delta_t$ measured satisfies equation (3) as provided below:

$$\Delta_t \leq T_F/2 \quad (3),$$

wherein $T_F$ represents frame period, and wherein the granularity of the measurement is equal to $((Clk\_Prd)/Frm\_Cnt*Frm\_Prd))*10^6$.

The clock correction error parameters are calculated in terms of clock cycles instead of PPM to reduce/minimize the amount of processing power consumed during calculations. The clock error correction unit 400 further includes a lookup table (LUT) 430 maintaining multiple analog-to-digital (A/D) values corresponding to different correction parameters.

Figure 8:
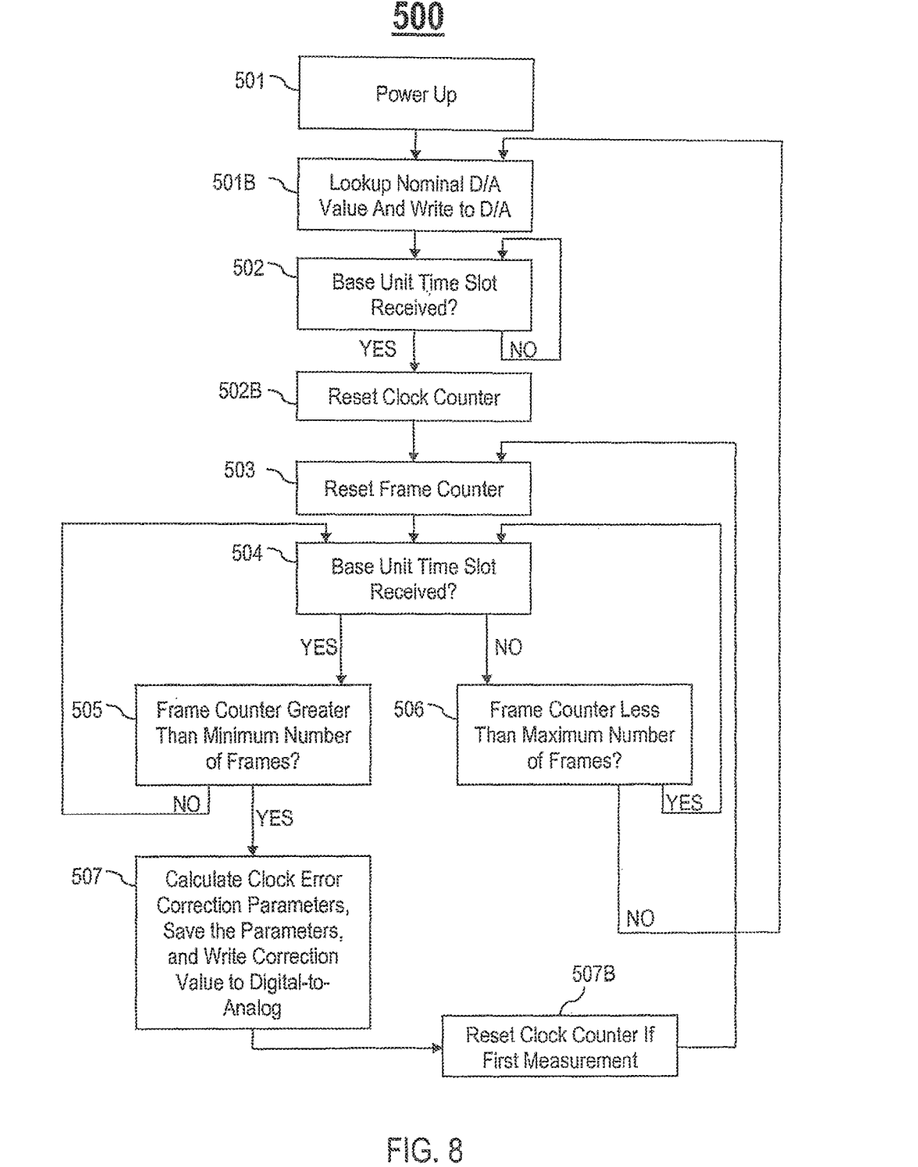
FIG. 8 is a flowchart of an example process for determining when clock error correction parameters are calculated, in accordance with a preferred embodiment of the present invention.

FIG. 8 is a flowchart of an example process 500 for determining when clock error correction parameters are calculated, in accordance with a preferred embodiment of the present invention. In process block 501, a mobile unit 12 is powered up/powered on. In process block 501B, the mobile unit 12 lookups a nominal D/A value in the lookup table 430 and writes to D/A. In process block 502, the mobile unit 12 determines whether a frame 1 from. a base unit 11 is received during a base unit time slot 120 by searching for the base unit time slot 120. If a frame I from the base unit: 11 is received, proceed to process block 502B. If a frame 1 from the base unit 11 is not received, return, to process block 502.

In process block 502B, a clock counter 410 maintained by the mobile unit 12 is reset. In process block 503, a frame counter 420 maintained by the mobile unit 12 is reset. The clock counter 410 is incremented every clock cycle, and the frame counter 420 is incremented when the clock counter 410 equals MAX_CLK_CNT/2.

In process block 504, the mobile unit 12 determines whether another frame 1 from the base unit 11 is received during another base unit time slot: 120 by searching for another base unit time slot 120. If another frame 1 from the base unit 11 is received, proceed to process Work 505. If another frame 1 from the base unit 11 is not received, proceed to process block 506.

In process block 505, the mobile unit 12 checks whether a minimum number of frames 1 has transpired by determining whether the frame counter 420 is greater than the minimum number of frames 1. If the frame counter 420 is greater than the minimum number of frames 1, proceed to process block 507. If the frame counter 420 is not greater than the minimum number of frames 1, return to process block 504.

In process block 506, the mobile unit 12 checks whether a maximum number of frames 1 has transpired by determining whether the frame counter 420 is less than the maximum number of frames 1. If the frame counter 420 is less than the maximum number of frames, return to process block 504. If the frame counter 420 is not less than the maximum number of frames, return to process block 501B as the process has failed.

In process block 507, calculate multiple clock error correction parameters, save the parameters calculated, and write a clock error correction value to a converter 16 of the mobile unit 12, wherein a slave clock 13 of the mobile unit 12 is adjusted based on the clock error correction value calculated. In process block 507B, the clock counter 410 maintained by the mobile unit 12 is reset only if first measurement. After process block 507B, the process returns to process block 503.

Figure 9:
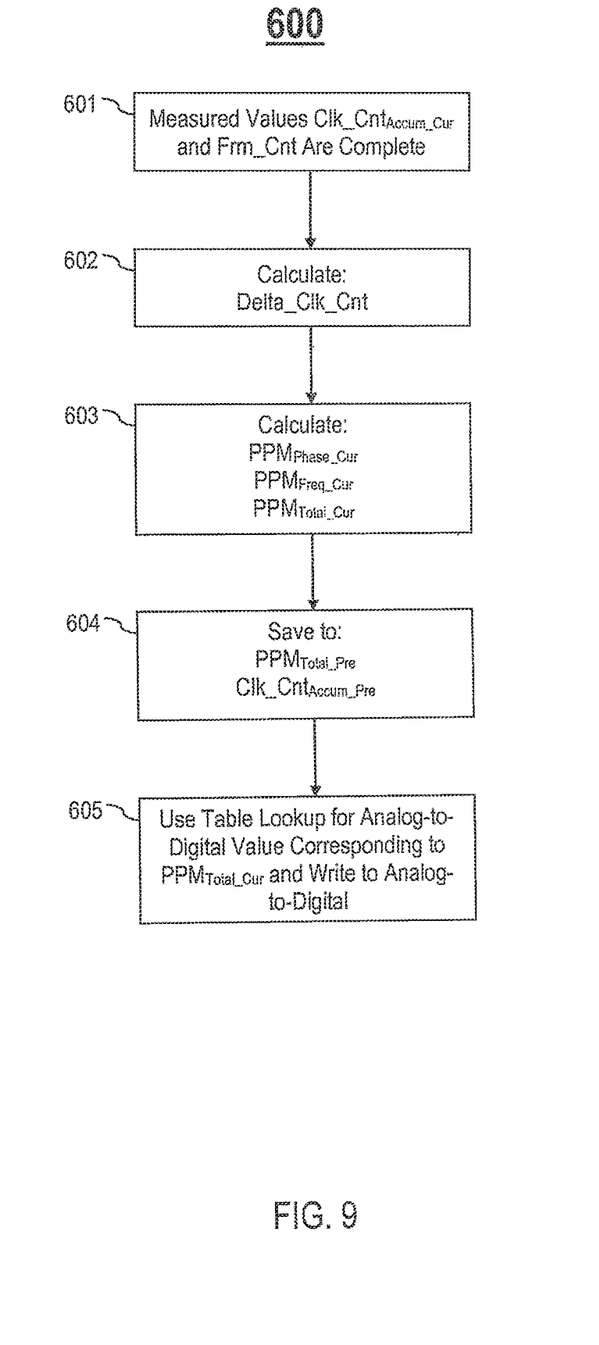
FIG. 9 is a flowchart of an example process for calculating clock error correction parameters, in accordance with a preferred embodiment of the present invention.

FIG. 9 is a flowchart of an example process 600 for calculating clock error correction parameters, in accordance with a preferred embodiment of the present invention. In process block 601, determine whether measured values for current accumulated clock count value $Clk\_Cnt_{Accum\_Cur}$ and $Frm\_Cnt$ in the clock counter 410 and the frame counter 420, respectively, are complete. In process block 602, calculate $Delta\_Clk\_Cnt$ in accordance with equation (4) as provided below:

$$Delta\_Clk\_Cnt = Clk\_Cnt_{Accum\_Cur} - Clk\_Cnt_{Accum\_Pre} \quad (4),$$

wherein $Clk\_Cnt_{Accum\_Pre}$ denotes a previous accumulated clock count value.

In process block 603, calculate a current phase correction parameter $PPM_{Phase\_Cur}$, a current frequency correction parameter $PPM_{Freq\_Cur}$, and a current total correction parameter $PPM_{Total\_Cur}$ in accordance with equations (5), (6) and (7), respectively, as provided below:

$$PPM_{Phase\_Cur} = -Clk\_Cnt_{Accum\_Cur} * CONST_{PPM} * CONST_{Phase\_Loop} / CONST_{Frm\_Cnt} \quad (5),$$

$$PPM_{Freq\_Cur} = -((Delta\_Clk\_Cnt * CONST_{PPM}) / Frm\_Cnt) + PPM_{Total\_Pre} \quad (6), \text{ and}$$

$$PPM_{Total\_Cur} = PPM_{Phase\_Cur} + PPM_{Freq\_Cur} \quad (7),$$

wherein $CONST_{PPM} = (Clk\_Prd * 10^6)/Frm\_Prd$, wherein $CONST_{Phase\_Loop}$ represents a phase loop constant that is less than 1, and wherein $CONST_{Frm\_Cnt}$ represents an estimated number of frames between calculations. If first measurement, $PPM_{Phase\_Cur}$ is set to 0 instead.

In process block 604, update a previous total correction parameter $PPM_{Total\_Pre}$ and a previous accumulated clock count value $Clk\_Cnt_{Accum\_Pre}$ accordance with equations (8) and (9), respectively, as provided below:

$$PPM_{Total\_Pre} = PPM_{Total\_Cur} \quad (8), \text{ and}$$

$$Clk\_Cnt_{Accum\_Pre} = Clk\_Cnt_{Accum\_Cur} \quad (9).$$

If first measurement, $Clk\_Cnt_{Accum\_Pre}$ is set to 0 instead.

In process block 605, lookup an A/D value corresponding to the current total correction parameter $PPM_{Total\_Cur}$, and update the slave clock 13 by writing the A/D value to the converter 16.

In one preferred embodiment of the present invention, the current frequency correction parameter $PPM_{Freq\_Cur}$ is derived in accordance with equations (10)-(12), as provided below:

$$Delta\_Clk\_Cnt_{Phase} = PPM_{Phase\_Pre} * Frm\_Cnt/CONST_{PPM} \quad (10),$$

$$Delta\_Clk\_Cnt_{Freq} = Delta\_Clk\_Cnt - Delta\_Clk\_Cnt_{Phase} \quad (11), \text{ and}$$

$$PPM_{Freq\_Cur} = -Delta\_Clk\_Cnt_{Freq} * CONST_{PPM} / Frm\_Cnt + PPM_{Freq\_Pre} \quad (12),$$

wherein $PPM_{Phase\_Pre}$ denotes a previous phase correction parameter, and wherein $PPM_{Freq\_Pre}$ denotes a previous frequency correction parameter.

In one preferred embodiment of the invention, the current frequency correction parameter $PPM_{Freq\_Cur}$ may be substituted in accordance with equation (13), as provided below:

$$PPM_{Freq\_Cur} = -Delta\_Clk\_Cnt * CONST_{PPM} / Frm\_Cnt + PPM_{Phase\_Pre} + PPM_{Freq\_Pre} \quad (13).$$

In one preferred embodiment of the present invention, the current frequency correction parameter $PPM_{Freq\_Cur}$ may further be substituted in accordance with equation (14), as provided below:

$$PPM_{Freq\_Cur} = -Delta\_Clk\_Cnt * CONST_{PPM} / Frm\_Cnt + PPM_{Total\_Pre} \quad (14).$$

Figure 10:
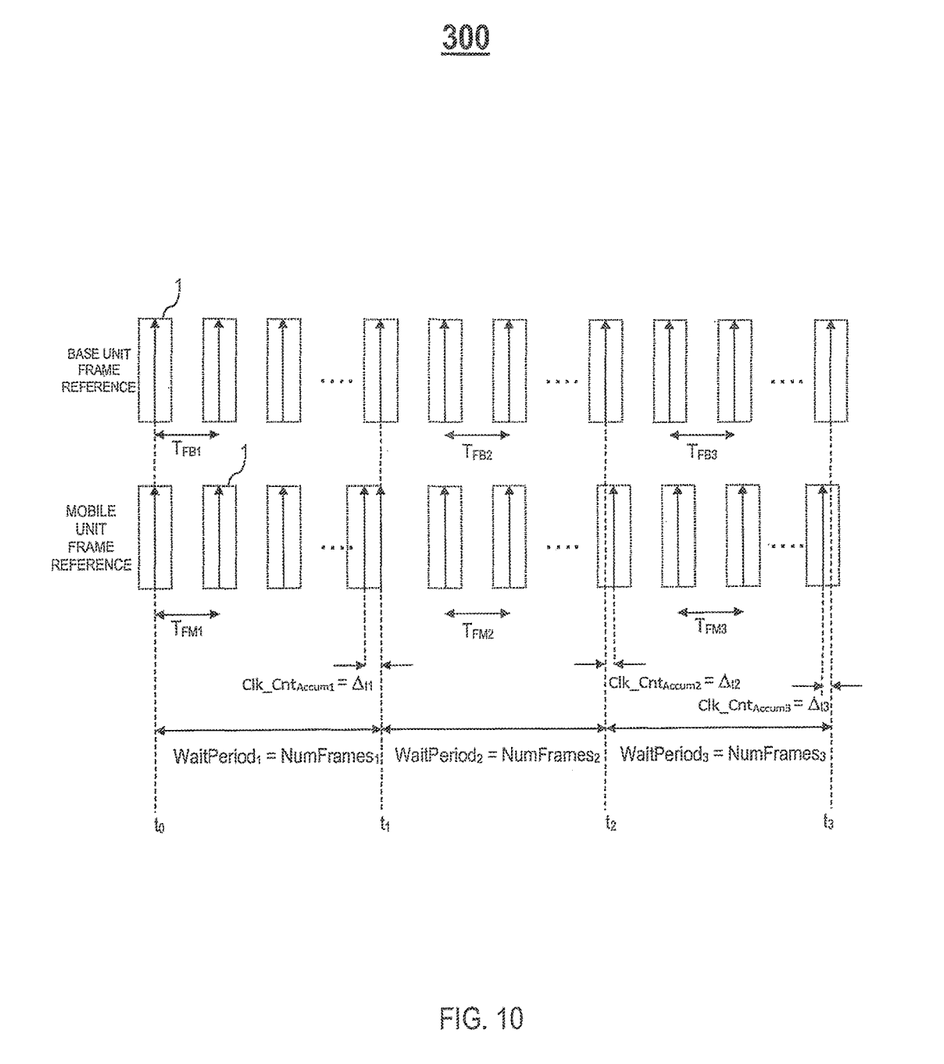
FIG. 10 is an example timing diagram illustrating clock synchronization between a system master clock of a base unit and a slave clock of a mobile unit, in accordance with a preferred embodiment of the invention.

FIG. 10 is an example timing diagram 300 illustrating clock synchronization between a system master clock 14 of a base unit 11 and a slave clock 13 of a mobile unit 12, in accordance with a preferred embodiment of the invention, As shown in FIG. 10, frames 1 from the mobile unit 12 drift over time and fall out of alignment. To prevent further drifting, adjustments to the slave clock 13 must factor in differences in frequency between the system master clock 14 and the slave clock 13. Further, to pull the frames back into alignment, adjustments to the slave clock 13 must also account for differences in phase between the system master clock 14 and the slave clock 13. To compensate for differences in phase, the mobile unit 12 pulls the slave clock 13 clock by a different amount than is needed to correct differences in frequency. During each measurement pass (e.g., a first measurement at time $t_1$, a second measurement at time $t_0$, a third measurement at time $t_3$), the mobile unit 12 determines how much of a time difference $\Delta_t$ (e.g., a first time difference $\Delta_{t1}$ between the base unit 11 and the mobile unit 12 measured in units of number of mobile unit clock cycles $Clk\_Cnt_{Accum1}$, a second time difference $\Delta_{t2}$ between the base unit 11 and the mobile unit 12 measured in units of number of mobile unit clock cycles $Clk\_Cnt_{Accum2}$, a third time difference $\Delta_{t3}$ between the base unit 11 and the mobile unit 12 measured in units of number of mobile unit clock cycles $Clk\_Cnt_{Accum3}$) measured is attributable to frequency drift and adjustments made to the slave clock 13 during a previous measurement pass. The mobile unit 12 compensates for differences in frequency and/or phase between the system master clock 14 and the slave clock 13 by pulling the slave clock 13. The frame counter 420 and clock counter 410 maintained by the mobile unit 12 may not be adjusted to prevent slips in frames (e.g., slips in audio samples).

For example, upon powering up/on at start time $t_0$ and receiving a frame 1 from the base unit 11 during a base unit time slot 120, the mobile unit 12 resets its counters 410, 420, and aligns its frames 1 in accordance with the frame structure 110. The mobile unit 12 begins a first calculation loop/cycle during which the mobile unit 12 waits during a first wait period $WaitPeriod_1$ between $t_1$-$t_0$ for a minimum number of frames 1 to transpire. Let $T_{FB1}$ and $T_{FM1}$ denote a frame period of the base unit 11 and the mobile unit 12 in the first wait period $WaitPeriod_1$, respectively. As the frame counter 420 and the clock counter 410 are not reset during the first wait period $WaitPeriod_1$, the mobile unit frame reference drifts and falls out of alignment with the base unit frame reference. The fast loop ends when the mobile unit 12 receives a frame 1 from the base unit 11 during a base unit time slot 120 after the minimum number of frames 1 has transpired. At the end of the first loop, the mobile unit 12 computes/performs a first measurement at time $t_1$ by calculating a first time difference $\Delta_{t1}$ and clock error correction parameters, and adjusting the slave clock 13 based on the clock error correction parameters calculated. The clock error correction parameters calculated at the first measurement pass factors in differences in frequency; clock error correction parameters calculated at the first measurement pass does not factor differences in phase between the system master clock 14 and the slave clock 13. The clock counter 410 is reset after the first measurement to align the mobile unit frame reference with the base unit frame reference. The clock counter 410 is not reset after the first measurement. Let NumFrames$_1$ denote the number of frames 1 that has transpired during the first loop. WaitPeriod$_1$ is measured in units of the number of frames NumFrames$_1$ transpired.

In one embodiment, the frame counter 420 gets reset after every measurement.

The mobile unit 12 begins a second loop during which the mobile unit 12 waits during a second wait period WaitPeriod$_2$ between t$_2$-t$_1$ for a minimum number of frames 1 to transpire. Let T$_{FB2}$ and T$_{FM2}$ denote a frame period of the base unit 11 and the mobile unit 12 in the second wait period WaitPeriod$_2$; respectively. The mobile unit frame reference may drift and fall out of alignment with the base unit frame reference. The second loop ends when the mobile unit 12 receives a frame 1 from the base unit 11 during a base unit time slot 120 after the minimum number of frames 1 has transpired. At the end of the second loop, the mobile unit 12 computes/performs a second measurement at time t$_2$ by calculating a second time difference $\Delta_{t2}$ and clock error correction parameters, and adjusting the slave clock 13 based on the clock error correction parameters calculated. The clock error correction parameters calculated at the second measurement pass factors in differences in frequency and phase. The frame counter 420 and the clock counter 410 are not adjusted. Let NumFrames$_2$ denote the number of frames 1 that has transpired during the second loop. WaitPeriod$_2$ is measured in units of the number of frames NumFrames$_2$ transpired.

The mobile unit 12 begins a third loop during which the mobile unit 12 waits during a third wait period WaitPeriod$_3$ between t$_3$-t$_2$ for a minimum number of frames 1 to transpire. Let T$_{FB3}$ and T$_{FM3}$ denote a frame period of the base unit 11 and the mobile unit 12 in the third wait period WaitPeriod$_3$, respectively. The mobile unit frame reference may drift and fall out of alignment with the base unit frame reference. The third loop ends when the mobile unit 12 receives a frame from the base unit 11, during a base unit time slot 120 after the minimum number of frames 1 has transpired. At the end of the third loop, the mobile unit 12 computes/performs a third measurement at time t$_3$ by calculating a third time difference $\Delta_{t3}$ and clock error correction parameters, and adjusting the slave clock 13 based on the clock error correction parameters calculated. The clock error correction parameters calculated at the second measurement pass factors in differences in frequency and phase. The frame counter 420 and the clock counter 410 are not adjusted. Let NumFrames$_3$ denote the number of frames 1 that has transpired during the third loop. WaitPeriod$_3$ is measured in units of the number of frames NumFrames$_3$ transpired.

Subsequent time difference measurements (i.e., the second time difference $\Delta_{t2}$ measured, the third time difference $\Delta_{t3}$ measured) factor differences in frequency and/or phase between the system master clock 14 and the slave clock 13.

During communication with the base unit 11, the mobile unit 11 continues as described above to pull its frames into alignment until a measured time difference $\Delta_t$ approaches zero. As the base unit 11 and the mobile unit 12 are in lock, and the mobile unit 12 computes/performs a measurement before frames 1 from the base unit 11 and the mobile unit 12 drift too far apart, the number of frames from the base unit 11 and the number of frames from the mobile unit 12 during each loop will be the same or substantially similar.

During each loop, not every frame 1 from the base unit 11 needs to be received by the mobile unit 12.

The method of maintaining clock synchronization and frame alignment as described herein are applicable to the digital systems/networks in FIGS.1-4, as well as other systems.

Example measurement passes are provided below. Assume the clock frequency of the slave clock 13 is 50 MHz, the frame frequency is 1 KHz, the PPM difference between the mobile unit 12 and the base unit 11 is 1 PPM, the CONST$_{Phase\_Loop}$ is 0.5, and the CONST$_{Frm\_Cnt}$ is 1000. At the end of the first loop, the Frm_Cnt is 1000. The mobile unit 12 computes/performs a first measurement at time t$_1$. Specifically, the current accumulated clock count value Clk_Cnt$_{Accum\_Cur}$, Delta_Clk_Cnt, the current phase correction parameter PPM$_{Phase\_Cur}$, the current frequency correction parameter PPM$_{Freq\_Cur}$, the current total correction parameter PPM$_{Total\_Cur}$, and the previous accumulated clock count value Clk_Cnt$_{Accum\_Pre}$ calculated at the end of the first loop are as follows:

Clk_Cnt$_{Accum\_Cur}$=0+50=50

Delta_Clk_Cnt=50−0=50

PPM$_{Phase\_Cur}$=0

PPM$_{Freq\_Cur}$=−50*20/1000+0=−1.0

PPM$_{Total\_Cur}$=0+−1.0=−1.0

Clk_Cnt$_{Accum\_Pre}$=0

Clk_Cnt=0

At the end of the first loop, the current accumulated clock count Clk_Cnt$_{Accum\_Cur}$ is 50. The current phase correction parameter PPM$_{Phase\_Cur}$ is 0. The current frequency correction parameter PPM$_{Freq\_Cur}$ is calculated to correct for differences in frequency. The Clk_Cnt$_{Accum\_Pre}$ and Clk_Cnt are set to 0.

In one preferred embodiment of the present invention, assuming essentially ideal conditions with a fixed PPM difference between the base unit 11 and the mobile unit 12, the current frequency correction parameter should not change at the end of different loops. The current phase correction parameter, however, will change at the end of different loops to methodically pull frames 1 from the mobile unit 12 into alignment until the current accumulated clock count value Clk_Cnt$_{Accum\_Cur}$ approaches zero.

At the end of the first loop, the PPM difference between the mobile unit 12 and the base unit 11 is 2 PPM. At the end of a second loop, Frm_Cnt is 1000. The mobile unit 12 computes/performs a second measurement at time t$_2$. The current accumulated clock count value Clk_Cnt$_{Accum\_Cur}$, Delta_Clk_Cnt, the current phase correction parameter PPM$_{Phase\_Cur}$, the current frequency correction parameter PPM$_{Freq\_Cur}$, and the current total correction parameter PPM$_{Total\_Cur}$ calculated at the end of the second loop are as follows:

Clk_Cnt$_{Accum\_Cur}$=0+50=50

Delta_Clk_Cnt=50−0=50

$$PPM_{Phase\_Cur} = -50*20*0.5/1000 = -0.5$$

$$PPM_{Freq\_Cur} = -50*20/1000 + -1.0 = -2.0$$

$$PPM_{Total\_Cur} = -0.5 + -2.0 = -2.5$$

At the end of the second loop, the current accumulated clock count $Clk\_Cnt_{Accum\_Cur}$ is 50. The current phase correction parameter $PPM_{Phase\_Cur}$, is calculated to reduce the current accumulated clock count $Clk\_Cnt_{Accum\_Cur}$. Any differences in frequency is factored in with the current frequency correction parameter $PPM_{Freq\_Cur}$.

At the end of a third loop, Frm_Cnt is 1000. The mobile unit 12 computes/performs a third measurement at time $t_3$. The current accumulated clock count value $Clk\_Cnt_{Accum\_Cur}$, Delta_Clk_Cnt, the current phase correction parameter $PPM_{Phase\_Cur}$, the current frequency correction parameter $PPM_{Freq\_Cur}$, and the current total correction parameter $PPM_{Total\_Cur}$ calculated at the end of the third loop are as follows:

$$Clk\_Cnt_{Accum\_Cur} = 50-25 = 25$$

$$Delta\_Clk\_Cnt = 25-50 = -25$$

$$PPM_{phase\_Cur} = -25*20*0.5/1000 = -0.25$$

$$PPM_{Freq\_Cur} = 25*20/1000 + -2.5 = -2.0$$

$$PPM_{Total\_Cur} = -0.25 + -2.0 = -2.25$$

At the end of the third loop, the current accumulated clock count $Cik\_Cnt_{Accum\_Cur}$ is 25. The current phase correction parameter $PPM_{Phase\_Cur}$ calculated reduced the current accumulated clock count $Clk\_Cnt_{Accum\_Cur}$ at the end of third loop to 25. Any differences in frequency is factored in with the current frequency correction parameter $PPM_{Freq\_Cur}$. As shown above, the current frequency correction parameter $PPM_{Freq\_Cur}$ calculated at the end of the third loop remains the same.

Figure 11:
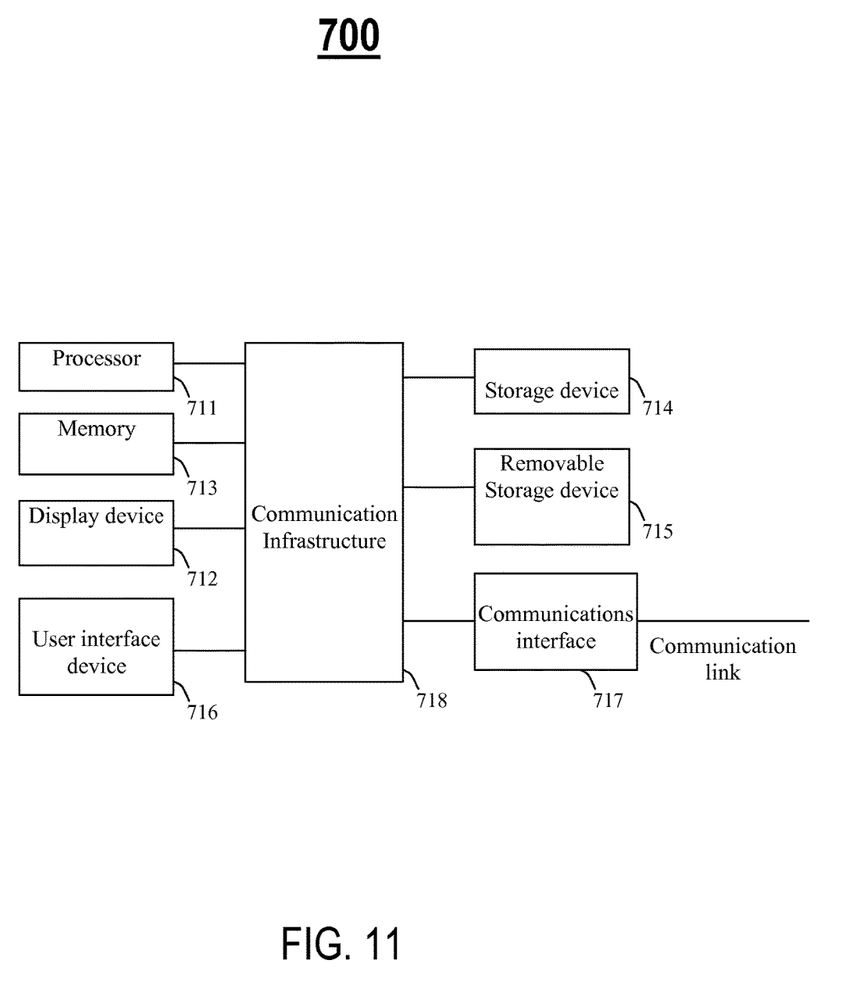
FIG. 11 is a high level block diagram showing a computer system useful for implementing a preferred embodiment of the present invention.

In one preferred embodiment of the present invention, a phase difference between the system master clock 14 and the slave clock 13, on average, will be zero. In one embodiment, the phase of the system master clock 14 is not locked with the phase of the slave clock 13 at any point in time, FIG. 11 is a high level block diagram showing a computer system 700 useful for implementing a preferred embodiment of the present invention. The computer system 700 includes one or mare processors 711, and can further include an electronic display device 712 (for displaying graphics, text, and other data), a main memory 713 (e.g., random access memory (RAM)), storage device 714, removable storage device 715 (e.g., removable storage drive, removable memory module, a magnetic tape drive, optical disk drive, computer readable medium having stored therein computer software and/or .data), user interface device. 716 (e.g., keyboard, touch screen, keypad, pointing device), and a communication interface 717 (e.g., modem, a network interface (such as an Ethernet card),a communications port, or a PCMCIA slot and card). The communication interface 717 allows software and data to be transferred between the computer system and external devices. The system further includes a communications infrastructure 718 (e.g., a communications bus, cross-over bar, or network) to which the aforementioned devices/modules are connected as shown.

Information transferred via communications interface 717 may be in the form of signals such as electronic, electromagnetic, optical, or other signals capable of being received by communications interface 717, via a communication link that carries signals and may be implemented using wire or cable, fiber optics, a phone line, a cellular phone link, an radio frequency (RF) link, and/or other communication channels. Computer program instructions representing the block diagram and/or flowcharts herein may be loaded onto a computer, programmable data processing apparatus, or processing devices to cause a series of operations performed thereon to produce a computer implemented process.

Computer programs (i.e., computer control logic) are stored in main memory and/or secondary memory. Computer programs may also be received via a communications interface. Such computer programs, when executed, enable the computer system to perform the features of the embodiments as discussed herein. In particular, the computer programs, when executed, enable the processor and/or multi-core processor to perform the features of the computer system. Such computer programs represent controllers of the computer system.

Embodiments can also be implemented in different ways such as firmware, as logic circuits, integrated circuits, as field-programmable gate array (FPGA), application specific integrated circuit (ASIC), as hardware only, as software only, as hardware and software.

The present invention has been described in considerable detail with reference to certain preferred versions thereof; however, other versions are possible. The above description is made for the purpose of illustrating the general principles of the present invention and is not meant to limit the inventive concepts claimed herein. Further, particular features described above can be used in combination with other described features in each of the various possible combinations and permutations. Unless otherwise specifically defined herein, all terms should be given their broadest possible interpretation including meanings implied from the specification as well as meanings understood by those skilled in the art and/or as defined in dictionaries, treatises, etc. Therefore, the spirit and scope of the appended claims should not be limited to the description of the preferred versions contained herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A mobile device, comprising:
   a slave clock;
   a receiver unit for receiving one or more frames from a remote device, the remote device including a master system clock;
   a transmitter unit for transmitting one or more frames; and
   a clock error correction circuitry configured to:
      count a number of frames that has transpired;
      determine whether a pre-determined number of frames has transpired based on the number of frames counted;
      adjust the slave clock in response to determining the pre-determined number of frames which has transpired in order to synchronize the slave clock with the master system clock; and
      determine a difference in frequency between the slave clock and the master system clock and a difference in phase between the slave clock and the master system clock, and adjust the slave clock based on the difference in frequency determined and the difference in phase determined to align frames transmitted from the transmitter unit;
   wherein the number of frames that has transpired is based in part on a number of clock cycles which have elapsed at the mobile device since a prior adjustment of the slave clock;
   wherein frames transmitted from the transmitter unit are aligned in accordance with a time-division multiplexing frame structure divided into multiple slots, the multiple slots including at least one slot designated for the remote device and one or more other slots designated for one or more mobile devices; and
   wherein the time-division multiplexing frame structure is a Time Division Multiple Access (TDMA) frame structure divided into a plurality of time slots, the plurality of time slots includes at least one time slot designated for the remote device, and the plurality of time slots further includes one or more other time slots designated for the one or more mobile devices.

2. The mobile device of claim 1, wherein the clock error correction circuitry is further configured to:
   maintain and increment a first counter value representing a number of clock cycles that has elapsed; and
   maintain and increment a second counter value representing the number of frames that has transpired;
   wherein each difference determined is based on each counter value maintained.

3. The mobile device of claim 2, wherein the clock error correction circuitry is further configured to:
   adjust the slave clock upon satisfying each of the following conditions: the pre-determined number of frames which has transpired, and a frame from the remote device is received during a time slot designated for the remote device.

4. The mobile device of claim 1, wherein the mobile device and the remote device exchange frames over one of a wired connection link and a wireless connection link.

5. A method, comprising:
   maintaining a slave clock in a mobile device;
   receiving, via a receiver unit of the mobile device, one or more frames from a remote device including a master system clock;
   transmitting, via a transmitter unit of the mobile device, one or more frames;
   counting, at a clock error correction unit of the mobile device, a number of frames that has transpired;
   determining, at the clock error correction unit, whether a pre-determined number of frames has transpired based upon the number of frames counted;
   adjusting, via the clock error correction unit, the slave clock in in response to determining the pre-determined number of frames which has transpired in order to synchronize the slave clock with the master system clock;
   determining, at the clock error correction unit, a difference in frequency between the slave clock and the master system clock and a difference in phase between the slave clock and the master system clock, and adjusting, via the clock error correction unit, the slave clock based on the difference in frequency determined and the difference in phase determined to align frames transmitted from the transmitter unit; and
   aligning frames transmitted from the transmitter unit in accordance with a time-division multiplexing frame structure divided into multiple slots, wherein the multiple slots include at least one slot designated for the remote device and one or more other slots designated for one or more mobile devices;
   wherein the number of frames that has transpired is based in part on a number of clock cycles which have elapsed at the mobile device since a prior adjustment of the slave clock; and
   wherein the time-division multiplexing frame structure is a Time Division Multiple Access (TDMA) frame structure divided into a plurality of time slots, the plurality of time slots include at least one time slot designated for the remote device to transmit a frame, and the plurality of time slots further include one or more other time slots designated for the one or more mobile devices to transmit a frame.

6. The method of claim 5, further comprising:
   maintaining and incrementing a first counter value representing a number of clock cycles that has elapsed; and
   maintaining and incrementing a second counter value representing the number of frames that has transpired;
   wherein each difference is determined based on each counter value maintained.

7. The method of claim 6, further comprising:
   adjusting, via the clock error correction unit, the slave clock upon satisfying each of the conditions: the pre-determined number of frames which has transpired, and a frame from the remote device is received during a time slot designated for the remote device.

8. A system, comprising:
   a remote device comprising a master system clock; and
   a mobile device comprising:
      a slave clock;
      a receiver unit for receiving one or more frames from the remote device;
      a transmitter unit for transmitting one or more frames; and
      a clock error correction circuitry configured to:
         count a number of frames that has transpired;
         determine whether a pre-determined number of frames has transpired based upon the number of frames counted;
         adjust the slave clock in response to determining the pre-determined number of frames which has transpired in order to synchronize the slave clock with the master system clock; and
         determine a difference in frequency between the slave clock and the master system clock and a difference in phase between the slave clock and the master system clock, and adjust the slave clock based on the difference in frequency determined and the difference in phase determined to align frames transmitted from the transmitter unit;

wherein the number of frames that has transpired is based in part on a number of clock cycles which have elapsed at the mobile device since a prior adjustment of the slave clock;

wherein frames transmitted from the transmitter unit are aligned in accordance with a time-division multiplexing frame structure divided into multiple slots, the multiple slots including at least one slot designated for the remote device and one or more other slots designated for one or more mobile devices; and wherein the time-division multiplexing frame structure is a Time Division Multiple Access (TDMA) frame structure divided into a plurality of time slots, the plurality of time slots includes at least one time slot designated for the remote device, and the plurality of time slots further includes one or more other time slots designated for the one or more mobile devices.

9. The system of claim 8, wherein the clock error correction circuitry is further configured to:

maintain and increment a first counter value representing a number of clock cycles that has elapsed; and maintain and increment a second counter value representing the number of frames that has transpired;

wherein each difference determined is based on each counter value maintained.

10. The system of claim 9, wherein the clock error correction circuitry is further configured to:

adjust the slave clock upon satisfying each of the conditions: the pre-determined number of frames which has transpired, and a frame from the remote device is received during a time slot designated for the remote device.

11. The system of claim 8, wherein the mobile device and the remote device exchange frames over one of a wired connection link and a wireless connection link.

12. A first device, comprising:
a slave clock;
a receiver unit for receiving one or more frames from a second device, the second device including a master system clock;
a transmitter unit for transmitting one or more frames; and
a clock error correction circuitry configured to:
count a number of frames that has transpired;

determine whether a pre-determined number of frames has transpired based on the number of frames counted;

adjust the slave clock in response to determining the pre-determined number of frames which has transpired in order to synchronize the slave clock with the master system clock; and determine a difference in frequency between the slave clock and the master system clock and a difference in phase between the slave clock and the master system clock, and adjust the slave clock based on the difference in frequency determined and the difference in phase determined to align frames transmitted from the transmitter unit;

wherein the number of frames that has transpired is based in part on a number of clock cycles which have elapsed at the mobile device since a prior adjustment of the slave clock;

wherein frames transmitted from the transmitter unit are aligned in accordance with a time-division multiplexing frame structure divided into multiple slots, the multiple slots including at least one slot designated for the remote device and one or more other slots designated for one or more mobile devices; and wherein the time-division multiplexing frame structure is a Time Division Multiple Access (TDMA) frame structure divided into a plurality of time slots, the plurality of time slots includes at least one time slot designated for the remote device, and the plurality of time slots further includes one or more other time slots designated for the one or more mobile devices.

13. The first device of claim 12, wherein the clock error correction circuitry is further configured to:

maintain and increment a first counter value representing a number of clock cycles that has elapsed; and maintain and increment a second counter value representing the number of frames that has transpired;

wherein each difference determined is based on each counter value maintained.

14. The first device of claim 13, wherein the clock error correction circuitry is further configured to:

adjust the slave clock upon satisfying each of the following conditions: the pre-determined number of frames which has transpired, and a frame from the second device is received during a time slot designated for the second device.

15. The first device of claim 12, wherein first device and the second device exchange frames over one of a wired connection link and a wireless connection link.

* * * * *